May 24, 1960    C. W. HEDSTROM    2,937,690
VEHICLE SADDLE CLAMPS
Filed Oct. 3, 1957
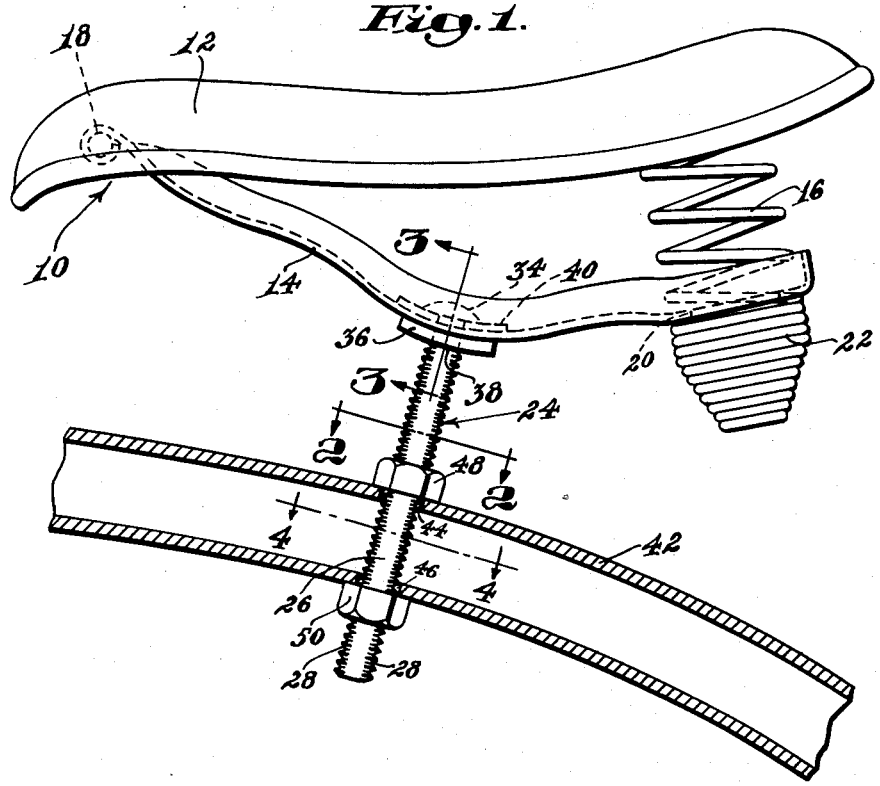
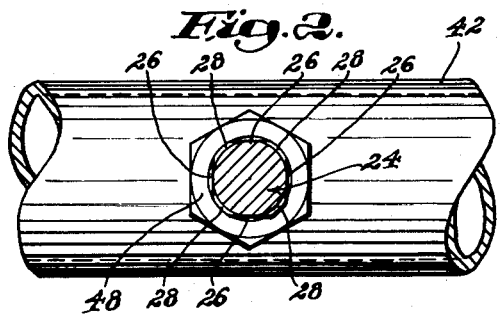
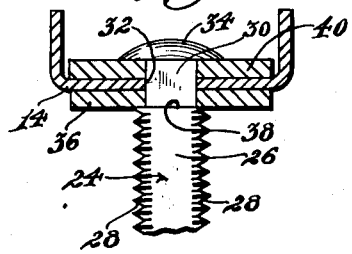
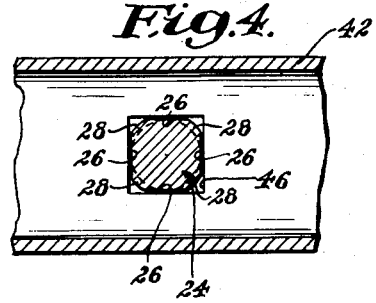
Inventor:
Carl W. Hedstrom,
by John H. McKenna
Attorney

2,937,690

VEHICLE SADDLE CLAMPS

Carl W. Hedstrom, Gardner, Mass., assignor to Hedstrom Union Company, Fitchburg, Mass., a corporation of Massachusetts Filed Oct. 3, 1957, Ser. No. 687,971

1 Claim. (Cl. 155—5.24)

This invention relates to improvements in vehicle saddle clamps and provides, more particularly, an improved saddle clamp for mounting a saddle or seat adjustably on a tubular frame part of a bicycle, tricycle, or the like.

It is among the objects of the invention to provide a simple, inexpensive, yet effective saddle clamp by means of which a vehicle saddle or seat quickly may be securely mounted on a frame part of a vehicle at any of various elevations relative to the said frame part.

Another object of the invention is to provide a vehicle saddle or seat clamp for securing a saddle or seat at any of various elevations above a supporting frame part of a vehicle and including coacting means on the clamp and on said frame part whereby the saddle or seat is locked against any rotational movement relative to the said frame part both when the saddle or seat is being adjusted and when the clamp is tightened upon the said frame part.

It is, moreover, my purpose and object generally to improve vehicle saddle or seat clamps and especially such clamps for adjustably mounting such saddles or seats on frame parts of vehicles of the bicycle and tricycle varieties.

In the accompanying drawing:

Fig. 1 is a side elevation of a vehicle saddle or seat mounted on a vehicle frame by clamping means embodying features of the present invention, only a fragment of the vehicle frame being shown, in medial cross-section;

Fig. 2 is a cross-sectional view on line 2—2 of Fig. 1, on a larger scale;

Fig. 3 is a detail cross-sectional view on line 3—3 of Fig. 1, on the scale of Fig. 2; and Fig. 4 is a detail cross-sectional view on line 4—4 of Fig. 1, on the scale of Figs. 2 and 3.

Referring to the drawing, a conventional variety of vehicle saddle or seat is represented generally at 10, including the usual padded body 12, base 14, and a pair of coil springs, only one of which is shown at 16. Base 14 has its forward end pivotally connected at 18 to the under side of body 12, at the forward narrower end of the latter, whence it extends as a shallow channel downwardly and rearward and spreads laterally at its rear end portion which is provided with two laterally spaced openings 20 in its bottom wall, only one opening 20 being shown, by dotted lines, in Fig. 1.

Each spring 16 has a number of closely compacted convolutions below the base 14, as at 22, and each spring extends through one of the openings 20 and has a plurality of spread spirally extending coils resiliently engaged between a rear portion of the seat body 12 and the bottom wall of base 14, around one of the openings 20 therein. The upper ends of the springs are suitably attached to the under side of seat body 12 in any conventional manner, the described construction of the saddle and seat being well known.

According to the invention, a rugged post, indicated generally at 24, is exteriorly threaded and then is milled, ground, or otherwise machined, to provide the four right angularly related flat sides 26 but leaving substantial threaded portions 28 at the corner junctures of the flat sides 26. One end portion of post 24 is reduced to provide a cross-sectionally rectangular reduced post part 30 for entering through a rectangular opening at 32 in the bottom wall of base 14. The upper end of reduced part 30 is headed over at 34 within the base channel, with a plate member or washer 36 intervening between the post shoulder formed at 38 and the under side of the base channel, and a plate member or washer 40 intervening between the head 34 and the upper side of the base channel. The plate member or washer 40 preferably has width for nicely fitting between the base channel side walls, as best seen in Fig. 3, with the opposite side edges of member 40 generally parallel with the channel side walls, thereby increasing the lock against any rotation of post 24 relative to the saddle or seat 10 after the heading over of reduced part 30.

A fragment of a tubular frame element of a vehicle is represented at 42, opposite wall portions thereof being provided with rectangular openings at 44, 46 of size and shape for nicely receiving therethrough the generally cross-sectionally square threaded portion of post 24. Before post 24 is inserted through the openings in frame element 42, a nut 48 is screwed on the post for serving as a stop for limiting the degree to which the post may be inserted through the frame openings 44, 46, and for serving also as one jaw of a clamp, the other jaw of which is a second nut 50 screwed on the lower end portion of the post which projects beyond the frame element 42. Nut 48 may be adjusted along the post 24 to position the saddle or seat 10 at a selected elevation above frame element 42 when the nut is stopped against the upper side of the frame element, after which tightening of the lower nut 50 into engagement with the under side of the frame element effectively clamps the post rigidly to the frame element, with the angularly related walls of the frame openings 44, 46 coacting with the generally parallel adjacent flat sides of post 24, for locking the post against any rotative movement in frame element 42.

Hence, the saddle or seat 10 quickly and effectively may be clamped securely in any selected position of adjustment by means of a suitable wrench, and the saddle or seat quickly may be adjusted up or down to suit any particular requirements by merely loosening nut 50 and suitably adjusting nut 48 along post 24, followed by tightening of the lower nut 50 against the frame element 42.

It is intended that the patent shall cover, by suitable expression in the appended claim, whatever features of patentable novelty exist in the invention disclosed.

I claim as my invention:

In a vehicle having a frame and a saddle-seat, a mounting clamp for securing the saddle seat to an element of said frame comprising means defining a noncircular opening in the bottom of said saddle-seat, a post having a generally square cross-section and having rounded and threaded junction portions at each of the four corners of the post and extending along a substantial part of its length, abutment means associated with one end portion of said post for engaging the bottom surface of said saddle-seat when said post end portion is inserted in said saddle-seat opening, and means engaging the top surface of said saddle-seat and for clamping it against said abutment means, said frame element including a tube having its opposite walls substantially spaced apart, means defining square openings in said opposite tube walls for nice passage of the other end portion of said post when said other post end is inserted therethrough, and, a pair of nuts screwed on said post at opposite sides of said frame element, one of said nuts constituting an adjustable stop for fixing the height of said saddle-seat above said frame element and the other of said nuts being movable relative to said one nut to securely clamp said frame element between said two nuts on said post.

References Cited in the file of this patent

UNITED STATES PATENTS

| | | |
|---|---|---|
| 540,432 | Garford | June 4, 1895 |
| 894,019 | La Clare | July 21, 1908 |
| 1,391,633 | Hazelton | Sept. 20, 1921 |
| 2,130,252 | Snell | Sept. 13, 1938 |
| 2,723,132 | Oberwegner | Nov. 8, 1955 |

FOREIGN PATENTS

| | | |
|---|---|---|
| 219,877 | Great Britain | Aug. 7, 1924 |